United States Patent [19]

Larsen

[11] 4,025,480
[45] May 24, 1977

[54] DRY BLENDING SYSTEM FOR POLYETHYLENE FLUFF AND ADDITIVES

[75] Inventor: Olaf E. Larsen, Dallas, Tex.

[73] Assignee: Phillips Petroleum Company, Bartlesville, Okla.

[22] Filed: Nov. 19, 1975

[21] Appl. No.: 633,313

[52] U.S. Cl. .............................. 260/28.5 A; 259/5; 260/32.6 PQ; 260/33.4 PQ; 260/42.21; 260/42.46
[51] Int. Cl.² ........................................ C08L 91/06
[58] Field of Search ............. 260/28.5 A, 32.6 PQ, 260/33.4 PQ, 42.21, 42.46

[56] References Cited
UNITED STATES PATENTS

| | | | |
|---|---|---|---|
| 3,030,330 | 4/1962 | Cines et al. | 260/41 |
| 3,302,893 | 2/1967 | Feder et al. | 241/37 |
| 3,492,310 | 1/1970 | Carrow | 260/32.6 |

*Primary Examiner*—Melvyn I. Marquis

[57] ABSTRACT

A blend of polymer fluff, at least one dry additive and a slip agent is prepared by compounding the polymer fluff and the dry additive, introducing this mixture to a disc mill while simultaneously introducing the slip agent to the disc mill and thoroughly mixing the polymer fluff, additive and slip agent in the mill.

10 Claims, 1 Drawing Figure

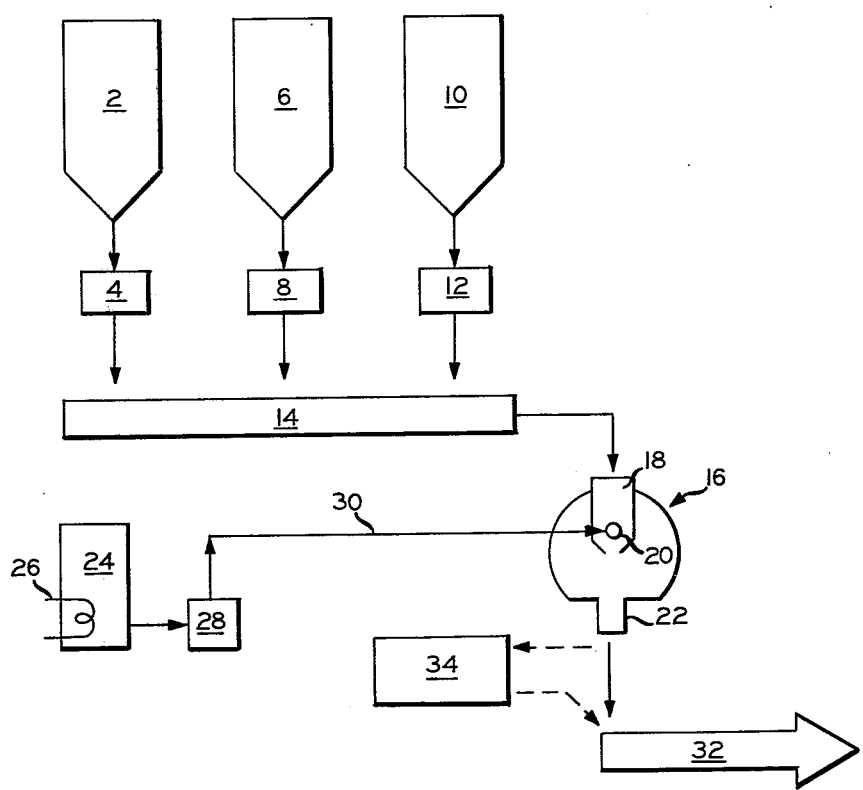

DRY BLENDING SYSTEM FOR POLYETHYLENE FLUFF AND ADDITIVES

This invention relates to the dispersion of additives in a solid polymer fluff. In one aspect this invention relates to a method for dispersing dry, particulate additives in a polymer fluff. In another aspect this invention relates to an apparatus for dispersing additives in a polymer fluff.

Olefin polymers have properties which make them highly desirable for use in extruding articles. An especially suitable olefin polymer is produced by polymerization of an olefin, or by copolymerization of a mixture comprising two olefins, with a suitable catalyst in a hydrocarbon diluent at a temperature such that substantially all of the polymer is insoluble in the hydrocarbon diluent. Such a polyolefin, which is sometimes called "particle form polymer", or more simply "polymer fluff", has greatly increased resistance to stress cracking, increased stress life and increased resistance to cyclic stress, all of these effects being especially noticeable at high temperatures.

Conventional methods of incorporating additives such as pigment, antioxidants, processing aids and the like, into these solid resinous polymers require at least one mixing step at an elevated temperature. In one method of incorporating additives with a resinous polymer, the powdered additives are mixed with the polymer and the resulting mixture is subjected to mechanical working, such as in a Banbury or on a roll mill. In order to obtain satisfactory dispersion of pigment in the solid product upon extrusion or molding, it is customary to employ an additional masterbatch step in which polymer pellets and a large amount of the pigment are blended thoroughly in a roll mill or in a Banbury mixer or similar apparatus and the resulting concentrate of polymer and pigment is used to color virgin polymer in the molding or extrusion operation. When liquid additives are required, this concentrate procedure usually produces poor results.

Attempts have been made to improve the pigment dispersion by employing such a masterbatching step, admixing the pigmented concentrate with virgin polymer and grinding the resulting mixture to a powder.

Each of the above methods imparts a heat history to the polymer. It is desirable, however, that the polymer have little or no heat history prior to being extruded or molded. It has been proposed that the polymer fluff be employed directly as the feed to the extrusion or molding equipment; however, it has been difficult to achieve proper dispersion of additives in the polymer by this method, particularly liquid additives, in small quantities.

In practice, a compromise approach has been adopted. A portion of the polymer fluff is masterbatched with the various additives. The masterbatch is pelleted and then ground to fine particles. The fine masterbatch particles are then dry blended with polymer fluff and other liquid additives in a tumble-type or cone blender. While this method represents an improvement over the art, it is difficult to achieve adequate dispersion of the liquid additives. Another drawback to this method is that in preparing 25 percent carbon black masterbatch pellets for letdown in virgin polymer at a ratio of 1:9, about 7½ weight percent of a higher melt flow polymer is used to allow greater dispersion to achieve a loading of 2 ½ weight percent carbon black in the final composition.

Another compromise approach currently in use is to masterbatch a portion of the polymer fluff with minor amounts of dry additives and the liquid additives in a Henschel type intensive mixer. Thence, this mixed blend is metered to the main stream of polymer fluff, the coloring additive such as carbon black and the final mixture fed to a continuous mixer such as a Farrel CFM, thence to a pelletizing extruder. This method is cumbersome, inflexible and expensive. Another disadvantage of the aforementioned system is that approximately 25 percent of the liquid additives are lost to the atmosphere by the process, thus necessitating adding the equivalent of approximately 1.10 percent of liquid to the concentrate to achieve 0.8 percent in the final product.

It is, therefore, an object of this invention to provide an improved method for incorporating additives with a polymer fluff.

It is another object of this invention to provide an improved system for incorporating additives with a polymer fluff.

It is yet another object of this invention to provide an improved method for dry blending a polymer fluff, at least one dry polymer additive and a liquid additive.

Other objects, aspects and advantages of the present invention will be apparent to those skilled in the art from a reading of the detailed specification, appended claims and the attached drawing which is a simplified flow diagram of a process for incorporating dry and liquid additives with a polymer fluff according to this invention.

In accordance with the present invention there is provided an improved method for incorporating additives with a solid polymer which comprises compounding a polymer fluff and at least one dry additive, introducing the resulting mixture to a disc-type mill while simultaneously introducing a liquid slip agent to the mill, mixing the polymer fluff, additive and slip agent in the mill and withdrawing therefrom the resulting blend.

The polymers with which the additives are incorporated are those normally solid thermoplastic polymers which can be recovered from solution into a fluffy, spongy form. Such polymers include the resinous polymers of monoolefins which have from 2 to 8 carbon atoms per molecule. Examples of suitable 1-olefins include ethylene, propylene, 1-butene, 1-pentene, 1-hexene, 1-octene, 4-methyl-1-pentene, 4-methyl-1-hexene, 5-ethyl-1-hexene, 6-methyl-1-heptene, and the like. Solid polymers of ethylene can be obtained by copolymerization of ethylene with 30 percent or less, preferably less than 15 weight percent of the monomer system, of the comonomers propylene, 1-butene and/or 2-butene.

Solid polymers can be prepared from mono-1-olefins having from 2 to 8 carbon atoms per molecule by cntacting the monomer or mixture of monomers under polymerizing conditions with a polymerization catalyst comprising a suspension of a chromium oxide-containing catalyst in a liquid hydrocarbon diluent at a temperature such that substantially all of the polymer produced is insoluble in the diluent and is in the form of solid particles.

Other methods of polymerizing 1-olefins to solid, resinous materials can also be employed. For example, solid olefin polymers prepared by low pressure processes which employ catalyst systems containing a Group IV metal halide and an organometal or an organometallic halide, can be used.

Also, conventional methods of polymerizing 1-olefins by high pressure processes can be used, such as a high pressure process for polymerizing ethylene, in which case the polyethylene is dissolved in a solvent and precipitated in order to place it in the desired form. When a polymer solution is not a product of the polymerization process, such a solution can be formed for subsequent polymer precipitation.

The additives which are incorporated into the olefin polymer fluff according to the invention include any type of solid, powdered dry additive such as pigments, antioxidants, stabilizers, modifiers and the like.

The slip agent can be glycerine, ethylene glycol, a mixture of a high molecular weight wax in glycerine, a mixture of glycerine and the amide of a higher fatty acid and the like.

Referring to the drawing, the apparatus of this invention comprises, in combination, a polymer storage bin 2; polymer metering means 4; colorant storage bin 6; colorant metering means 8; additives storage bin 10; additives metering means 12; first conveyor means 14; disc mill 16 having inlet means 18, liquid dispensing means 20, and outlet means 22; slip agent storage means 24 having heating means 26; slip agent metered pumping means 28; jacketed transfer line 30; second conveyor means 32; and, optionally, polisher 34.

Polymer fluff in polymer storage bin 2 is passed by polymer metering means 4 to conveyor means 14. Similarly, the colorant in colorant storage bin 6 and the additives in additives storage bin 10 are passed through their respective metering means 8 and 12 to the conveyor means 14. The conveyor means discharges the mixture of polymer fluff, colorant and additives to the inlet means 18 of disc mill 16.

The mill 16 is a conventional disc-type mill, such as that disclosed in U.S. Pat. No. 3,584,799, issued June 15, 1971 to F. Feder, which has been modified by the addition of a liquid dispensing means 20 to the inlet 18 of mill 16.

Slip agent, from slip agent storage means 24, heated by heating means 26, is pumped by metered pumping means 28 through the jacketed transfer line 30 to the liquid dispensing means 20 at the inlet 18 of mill 16. The heated slip agent is injected into the admixture of polymer fluff, colorant and additives being introduced into the inlet 18 of mill 16. The resulting mixture is subjected to intensive mixing as it passes through the discs of the mill.

The solid particles are discharged from the mill 16 through outlet means 22 to second conveyor means 32 which conveys the material to storage or to an extrusion or molding line, not shown.

The colorant is employed either as a color concentrate, i.e. masterbatch, or as pigment in powdered form. Color concentrates are pelletized blends of pigment in the resin containing a high loading of the pigment. The colorants are letdown with the polymer fluff at ratios ranging from 100:1 to 3:1.

In a first embodiment of the present invention, the colorant is employed in the form of masterbatch pellets. These pellets are finely broken up in the disc mill 16 to about the same particle size as the polymer fluff, producing a very unifrom mixture.

In a second embodiment of the present invention, pigment is employed in place of the masterbatch pellets. This embodiment requires the additional step of mixing the material discharged from the disc mill 16 in a polisher 34, such as that disclosed in U.S. Pat No. 3,472,491, issued October 14, 1969, to F. Feder. The solid material is discharged from the polisher to the second conveyor means 32, as above.

The colorants which are employed in the present invention can be any well known inorganic and/or organic pigment ordinarily blended with olefin polymers. Examples of suitable inorganic colorants are titanium dioxide, zinc sulfide, zinc oxide, cadmium sulfoselenide, iron oxide, chrome-tin, cadmium sulfide, cobalt aluminate and the like.

Examples of suitable organic colorants include carbon black, quinacridone, dioxazine violet, isoindolinone, Pigment Red 139, Pigment Yellow 93, phtalocyanine blue and the like.

The disc-type mill is operated at room temperature. As disclosed in U.S. Pat. No 3,584,799, such a mill has cooling air inlet openings which allow ambient are to be drawn into the mill housing. This air flows over the rotating disc for cooling thereof and then combines with the air initially brought in with the material and can serve as auxiliary conveying air for the material. The mill can also be water-cooled if desired.

The slip agent is supplied to the disc-type mill in a heated condition. The temperature to which the slip agent must be heated is dependent, inter alia, upon the particular slip agent and the liquid dispensing means 22 employed. Determination of this temperature should be made under operating conditions. For example, when a mixture of about 7 parts glycerine and about 1 part of a high molecular weight wax such as Carbowax is used as a slip agent, the mixture is heated to about 140° F (about 60° C).

When pigment in powdered form, rather than pelleted color concentrate, is used to color the virgin polymer fluff, the polisher 34 is used to temperature condition the dry blend of polymer fluff, pigment and other additives such that the pigment and additives adhere to the fluff particles. The polisher is operated to produce a temperature rise between the inlet and the outlet of the polisher. This can be accomplished by varying the residence time of the material by varying the drive speed of the polisher, relying upon the mechanical working heat produced by working the material to produce the desired increase in temperature; or, the polisher can be heated by external heating means. Whichever method is used, it is important that the maximum temperature of the polymer fluff in the polisher not exceed the melt temperature of the polymer.

Since most resinous polymers do not have sharp melting points, but instead melt over a range of perhaps 5–15° F (3–8° C), it is impracticable to set forth the maximum polishing temperature for all the polymers that can be employed in the present invention. The determination of this temperature should be made for each polymer employed.

The polisher is operated over a relatively narrow temperature range, i.e., from about 10° F below the melt temperature of the polymer up to the melt temperature of the polymer. As used herein, the term "melt temperature" is intended to mean the temperature at which the polymer begins to melt. At a few degrees above the melt temperature, the polymer fluff becomes tacky enough that the particles tend to agglomerate. At temperatures lower than 10° F (5°–6° C) below the melt temperature of the polymer, at least a portion of the free colorant tends to remain unattached to the polymer fluff. For example, in the case of a polyethylene having a melt temperature of a 270° F (132° C), the polisher would be operated such that the temperature of the material within the polisher would be in the range of 260°–270° F (127°–132° C).

Since the temperature buildup is not instantaneous, it is sufficient to measure the temperature of the material at the polisher outlet and adjust operating conditions accordingly to maintain the temperature within the range specified above.

Advantages of the present invention are that in the first embodiment using masterbatch pellets, the blending is accomplished in the mill and the use of a cone blender is eliminated. In the second embodiment, using free pigment, the blending is accomplished substantially without any heat history being applied to the material and also without the added cost of a masterbatch mixing step. Use of the invention permits adding the liquid additives without any substantial loss compared to the previously described Banbury mixer system. For example, the addition of 0.8 weight percent additives produced a 0.8 weight percent in the blend. The method of the invention permits blending on a continuous basis rather than a batch method as required by a cone blender.

Reasonable variations and modifications, which will be apparent to those skilled in the art, can be made in this invention without departing from the spirit and scope thereof.

What is claimed is:

1. A method for incorporating additives with a solid olefin polymer fluff which comprises compounding said polymer fluff and at least one dry additive, introducing the resulting mixture to a disc-type mill while simultaneously introducing a liquid slip agent to said mill, mixing said polymer fluff, said additive and said slip agent in said mill and withdrawing therefrom the resulting blend.

2. The method of claim 1 which additionally comprises introducing said blend to a polisher, polishing said blend in said polisher and withdrawing therefrom the resulting polished blend.

3. The method of claim 1 wherein said polymer is a normally solid polymer of at least one monoolefin having from 2 to 8 carbon atoms per molecule.

4. The method of claim 3 wherein said polymer is selected from the group consisting of ethylene homopolymers and copolymers of ethylene and at least one comonomer selected from the group consistng of propylene, 1-butene and 2-butene.

5. The method of claim 1 wherein at least one of said additives is a color concentrate.

6. The method of claim 2 wherein at least one of said additives is pigment.

7. The method of claim 6 wherein said polisher is operated to provide an outlet temperature ranging from the melt point of said polymer to about 10° F below said melt point.

8. The method of claim 6 wherein said colorant is carbon black.

9. The method of claim 5 wherein said slip agent is a mixture of about 7 parts glycerine and about 1 part of a high molecular weight wax.

10. The method of claim 6 wherein said slip agent is a mixture of about 7 parts glycerine and about 1 part of a high molecular weight wax.

* * * * *